US005797083A

United States Patent [19]

Anderson

[11] Patent Number: 5,797,083

[45] Date of Patent: Aug. 18, 1998

[54] SELF-ALIGNING SATELLITE RECEIVER ANTENNA

[75] Inventor: Paul R. Anderson, Hermosa Beach, Calif.

[73] Assignee: Hughes Electronics Corporation, El Segundo, Calif.

[21] Appl. No.: 577,605

[22] Filed: Dec. 22, 1995

[51] Int. Cl.[6] .......... H04B 7/14

[52] U.S. Cl. .......... 455/25; 455/3.2; 455/12.1; 455/562; 342/359; 342/376

[58] Field of Search .......... 455/25, 3.2, 277.1, 455/12.1, 13.1, 561, 562; 342/359, 77, 158, 368, 372, 376, 377

[56] References Cited

U.S. PATENT DOCUMENTS

| | | | |
|---|---|---|---|
| 5,173,708 | 12/1992 | Suzuki et al. | 342/359 |
| 5,519,405 | 5/1996 | Matsubara et al. | 342/359 |

*Primary Examiner*—Edward F. Urban
*Assistant Examiner*—Darnell R. Armstrong
*Attorney, Agent, or Firm*—John A. Crook; Michael W. Sales

[57] ABSTRACT

A method and device for aligning a satellite receiver antenna with a broadcast satellite is disclosed herein. The device includes a receiver for measuring a signal strength from the satellite and issuing commands based on the measurement, a receiver antenna capable of automatically changing its alignment, and a rough alignment indicator located remotely from the receiver for signalling when the antenna is pointed sufficiently toward the satellite allow the receiver to maximize the signal strength by aligning the antenna with the satellite via commands from the receiver. The method includes placing the receiver antenna on a stable surface, manually pointing the antenna in the direction of the satellite until an indicator signals that the antenna is preliminarily aligned, fixing the receiver antenna to the stable surface, and activating a device remote from the antenna to automatically perform final alignment of the antenna with the satellite.

21 Claims, 2 Drawing Sheets

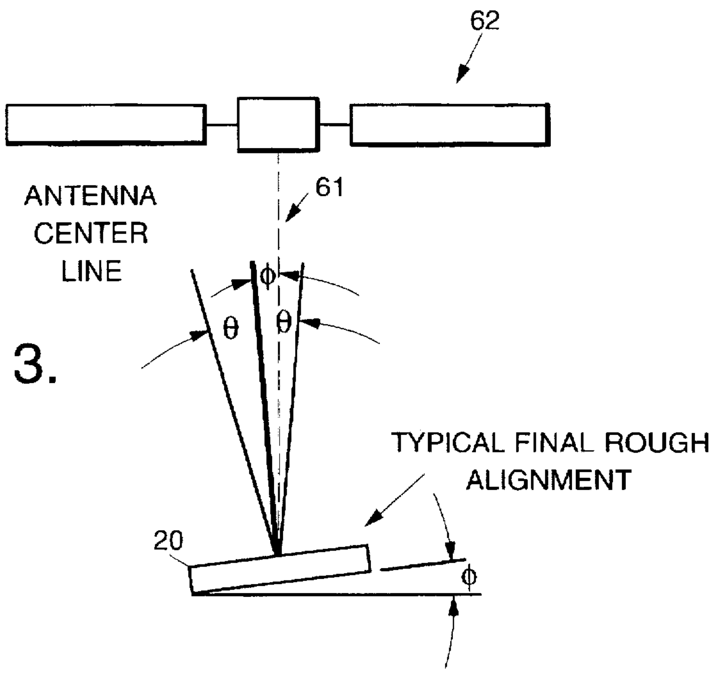
FIG. 3.
FIG. 4.
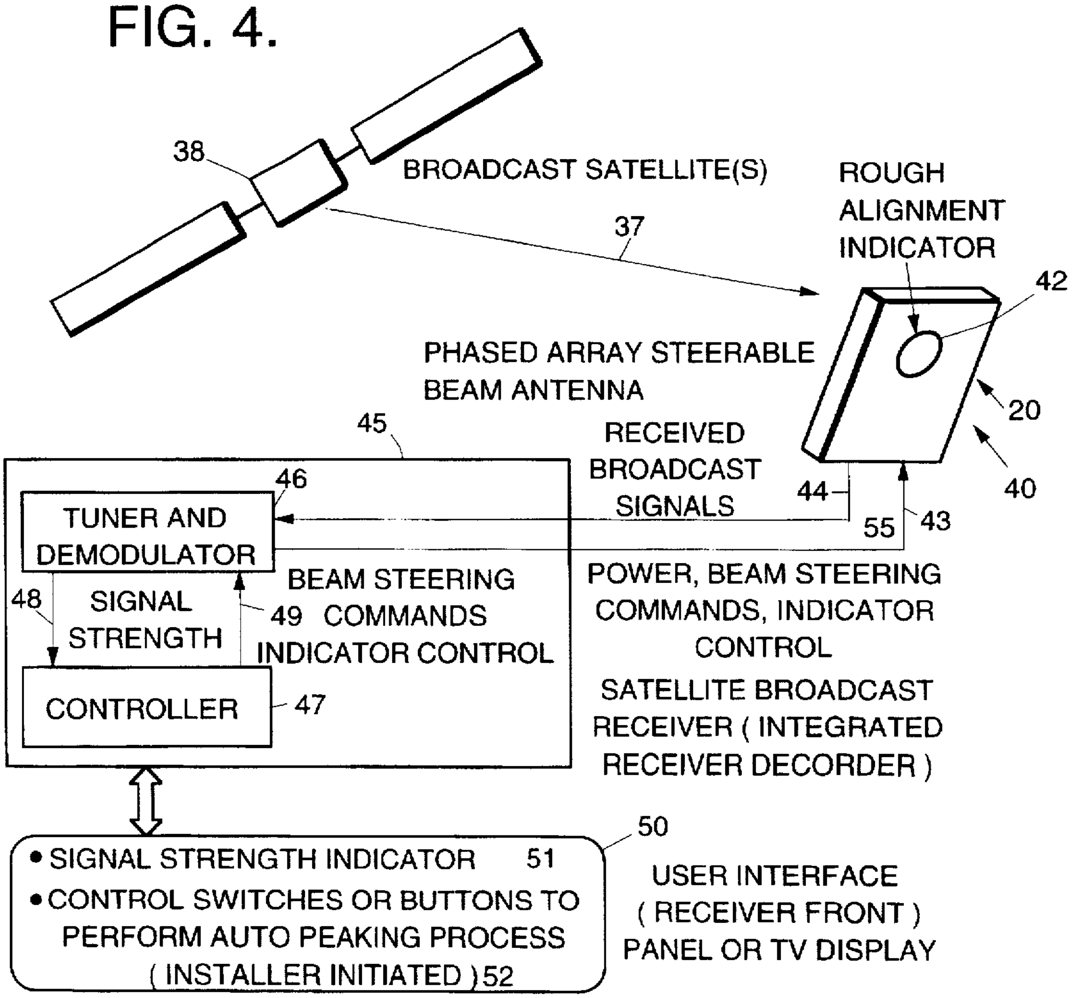

SELF-ALIGNING SATELLITE RECEIVER ANTENNA

BACKGROUND OF THE INVENTION

The present invention relates generally to digital satellite communication systems, and more particularly to a method and system for aligning a satellite receiver antenna with a geosynchronous-orbit satellite.

Generally, in modern digital satellite communication systems, a ground-based transmitter beams an uplink signal to a satellite positioned in a geosynchronous orbit. The satellite in turn relays the signal back to a ground-based receiver antenna.

Direct broadcast satellite ("DBS") systems allow households to receive digital television, audio, data, and video directly from a geosynchronous satellite. Each household subscribing to the system receives the digital broadcast signals on a satellite dish. The typical DBS home receiver includes an outdoor satellite antenna, usually configured as a 18-inch diameter parabolic dish, and an indoor television set-top decoder module or "IRD." Cables link the antenna to the IRD and television.

Subscribers can install current direct-to-home satellite receivers without professional assistance or equipment. The relatively small, lightweight receiver dish antenna is mounted outside the home in a direct line of sight with the broadcast satellite, typically southward. Because DBS signals are beamed from a "stationary" geosynchronous satellite, the dish should not need adjustment once it is fixed in place.

The subscriber points the antenna in the general direction of the satellite, then fine tunes the alignment by using an on-screen signal strength meter built into the satellite receiver IRD. The subscriber adjusts the antenna position until the on-screen meter shows that signal strength and quality has been maximized. This procedure, however, requires the installer to make numerous trips from the location of the antenna to the inside the home to view the meter.

Because known DBS systems typically transmit digital signals that include considerable forward error correction ("FEC" ) coding, reception can appear very clean and noise-free even though signal strength is only barely above an initial alignment threshold. Thus, if a non-professional installer chooses not to use the signal strength meter and relies on picture quality, the installer may be tempted to prematurely halt his antenna alignment because the FEC masks the low signal strength. A significant amount of communication link margin can be lost if the installer fails to properly finalize alignment of the antenna. This loss of margin can result in an increased likelihood of complete signal loss during fading conditions such as those caused by precipitation on the downlink side.

Some antennas are provided with remote controlled motorized mounts, which allow subscribers to align the outdoor antenna from inside the home. However, full alignment could still be compromised if the subscriber is reluctant to perform the numerous steps required by many remote-controlled motorized mounts. Also, as previously described, if the installer relies on perceived picture quality instead of using the signal strength meter, the installer would still be susceptible to prematurely halting antenna alignment.

More recent antenna designs have used a "phased array" concept to allow the antenna to be electronically pointed in a desired direction. Generally, a phased array antenna includes an arrangement of many small, simple antennas, such as dipoles, linked via delay lines to a receiver. The delay lines may be electronically controlled or "steered" to sum their received signals to be either in-phase or out-of-phase, thereby causing an effective gain from a desired direction. The antennas are typically constructed from lightweight materials by etching the components into a flat, compact surface.

Phased array antennas are steerable through only a limited angle, however. For this reason, manual alignment of the antenna during installation must be accurate. Thus, these antennas are subject to the same shortcomings during installation as described above.

Therefore, there is a need for an improved method and system for aligning a satellite receiver antenna that reduces installation complexity while maximizing received signal strength.

SUMMARY OF THE INVENTION

The present invention provides a method and system for aligning a receiver antenna with a satellite. The invention may be embodied in a system that provides an antenna with the means to automatically and remotely finalize alignment in a manner that maximizes received signal strength. Preferably, the inventive system includes a receiver that measures the strength of a received satellite signal and issues commands based on the measurement, a satellite receiver antenna having automatic and remote alignment capabilities in communication with the receiver, and an indicator in communication with the receiver that signals when rough alignment has been achieved by the installer. The system's antenna may be a steerable phased array antenna.

The present invention may further be embodied in a method that includes the steps of placing a satellite receiver antenna on a stable surface, manually pointing the antenna toward a satellite until a rough-alignment indicator signals that the antenna is preliminarily aligned, fixing the receiver antenna to the stable surface, and activating a fine-alignment device remote from the antenna to remotely perform final alignment with the satellite.

Thus, the present invention provides an improved system and method of aligning a satellite receiver antenna. Preferably, the antenna is of a phased array type which allows the user to finalize alignment of the antenna automatically, with little manual manipulation. The present invention may be used on direct-to-home satellite receiver systems to significantly simplify the installation procedure. This reduces the need for professional home installation and reduces the overall cost of home receiver systems.

It is to be understood that both the foregoing general description and the following detailed description are exemplary and explanatory and are intended to provide further explanation of the invention as claimed. The invention, together with the further objects and intended advantages, will best be understood by reference to the following detailed description, taken in conjunction with the accompanying drawings.

BRIEF DESCRIPTION OF THE DRAWINGS

FIG. 3 is a block diagram of the alignment angles used in aligning the phased array antenna shown in FIGS. 1 and 3.

FIG. 4 is a block diagram of a satellite receiver system of the present invention utilized with the system shown in FIG. 1 and the phased array antenna shown in FIGS. 2 and 3.

DETAILED DESCRIPTION OF THE PRESENTLY PREFERRED EMBODIMENTS

Figure 1:
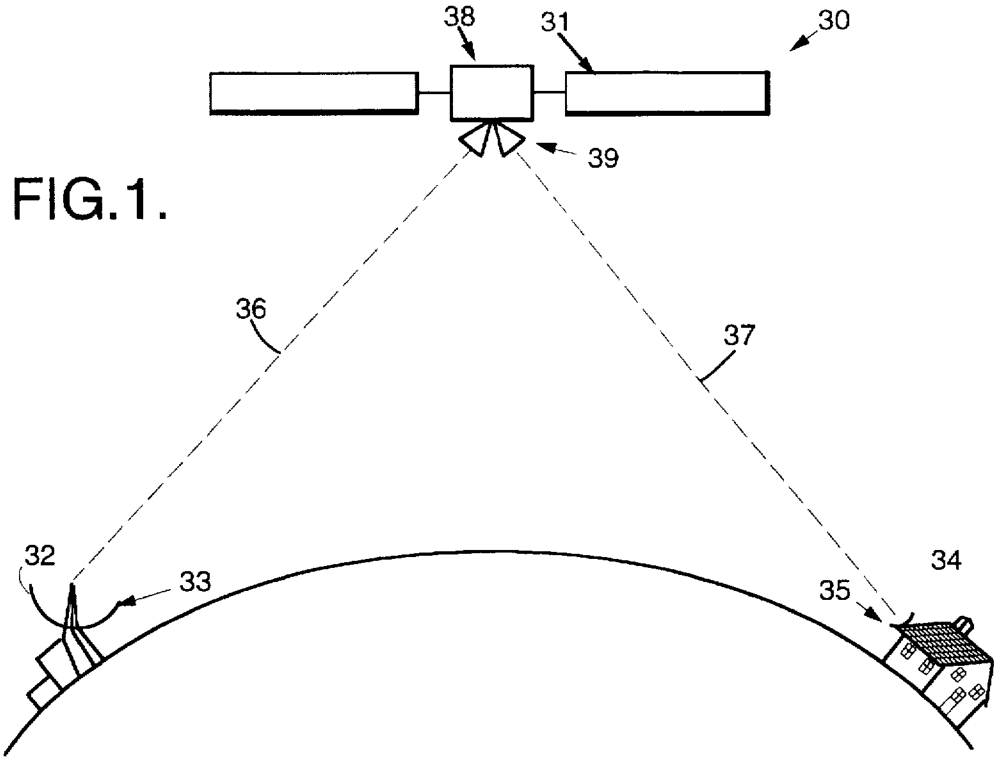
FIG. 1 is a block diagram of a direct-to-home satellite broadcast system capable of utilizing the method and apparatus of the present invention.

Referring now to the drawings, FIG. 1 illustrates a digital DBS system 30 capable of utilizing the present invention. The system 30 includes a ground-based broadcast transmitter 32, a space segment 31 including satellite 38, and a ground-based subscriber receiving station 34. In an exemplary DBS system, the satellite 38 is a geosynchronous satellite, such as the Hughes® HS-601™ spacecraft, positioned at a geosynchronous orbital location at approximately 101° W longitude. The home subscriber receiving station 34 includes a dish antenna 35 and a receiver/decoder box or IRD (not shown) located within the home.

The broadcast transmitter 32 receives digitally modulated television or audio signals and beams them at 17.3–17.8 Ghz to satellite 38. The satellite 38 translates the signals to 12.2–12.7 Ghz then beams them to the dish antenna 35 of receiving station 34 for subsequent demodulation. The satellite 38 transmits downlink signals via on-board transponders 39 operating at a power level of 120 to 240 watts. For a typical DBS system, the uplink to the satellite has an analog bandwidth of 24 Mhz, the symbol rate is 20M symbols/sec, and the total bit rate is 40 Mbps.

Figure 2:
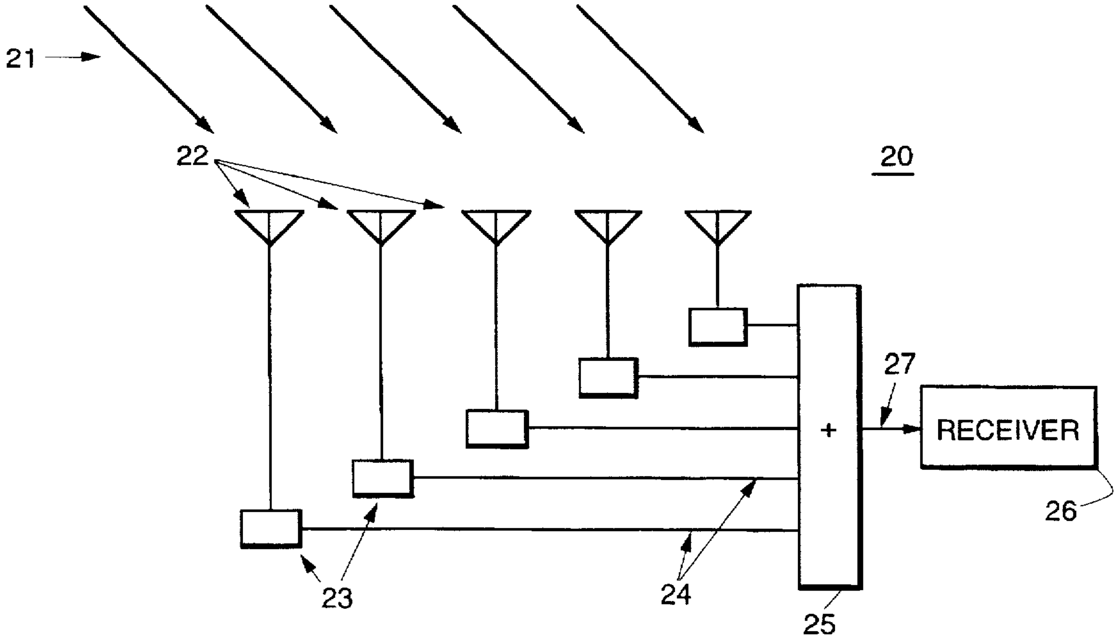
FIG. 2 is a block diagram of a phased array antenna structure which may be used in the system of FIG. 1.

FIG. 2 illustrates a phased array antenna capable of being used in connection with the present invention. The antenna 20 includes an array of several simple dipole antennas 22 arranged in a flat grid. Each of the dipole antennas 22 is linked through a delay line 23, and subsequently linked through lines 24 to an antenna controller 25. The controller 25 is connected to the receiver unit 26 via outdoor cable 27.

When the antenna 20 is in operation, the delay lines 23 are adjusted by controller 25 so that the signal 21 received from each of dipoles 22 are summed in-phase. An effective gain is established in the desired direction by maximizing the combined received signal power when the signal 21 arrives from the desired beam direction. Signals received from other directions are summed by the controller 25 out-of-phase. The received signal power of these undesired signals is therefore significantly decreased. The dipoles 22 maximize the power in signal 21 in a single direction. Phased array antennas can thus be "electronically steered" very rapidly to receive signals from a desired direction, thereby eliminating some of the mechanical difficulties which may occur when steering an antenna via a mechanical system.

The distance between the dipole antennas 22 as they are arranged in the grid determines the steering angle θ of the phased array antenna 20 shown in FIG. 3. The phased array antenna 20 is steerable relative to the broadcast satellite 62 and its beam centerline 61. The beam of the phased array antenna 20 is steerable over plus or minus θ degrees. The antenna 20 can be steered throughout this angle without significant degradation of receiving performance. The antenna 20 may also need to be steered along an axis perpendicular to that shown in FIG. 3. The antenna 20 can be steered through the same angles along the perpendicular axis using the same methods illustrated herein.

Rough alignment to angle Φ is achieved by physically moving the antenna 20 until the received signal strength exceeds a certain selected threshold value. This rough alignment angle is a function of the selected signal strength threshold as well as the spacecraft transmitted power. Preferably, the signal strength threshold selected for rough alignment must ensure that the angle Φ is less than the angle θ over all likely conditions.

FIG. 4 illustrates a receiver antenna, alignment system, and satellite broadcast receiver according to the present invention. The receiver system 40 preferably includes a phased array steerable beam antenna 20, a satellite broadcast receiver 45, and a user interface 50. The phased array steerable beam antenna 20 preferably includes a rough alignment indicator 42 in the form of an L.E.D. mounted on the rear of antenna 20 or its base (not shown). An outdoor line 55, preferably multiple low-voltage DC connections, links the antenna 20 with the satellite broadcast receiver 45. The receiver 45 preferably includes an integrated receiver decoder ("IRD") set-top unit for decoding the received broadcast signals from the antenna 20. The IRD 45 houses a tuner and demodulator sub-system 46 linked to a controller sub-system 47. The IRD 45 is in turn linked to a user interface 50, which preferably includes the screen of a television or front panel display on the IRD 45.

The user interface 50 is employed to assist the installer during the installation and the final alignment or "peaking" process. The user interface 50 can be either a front panel display on the IRD 45, or a user screen displayed on a conventional television set. The panel or screen may display signal strength or other positioning information, and provides some means for the installer to initiate automatic alignment of the antenna 20.

To install the phased array antenna 20, the user preliminarily aligns antenna 20 until the rough alignment indicator 42 indicates that the antenna 20 is pointed sufficiently toward the orbiting satellite 38 to allow antenna 20 to subsequently complete alignment with the satellite 38. The user then permanently fixes the antenna 20 in its present position and returns to the IRD 45, preferably located indoors. The user then activates the final alignment process using the user interface 50.

The complete installation and alignment procedures will now be described, making particular references to all of the figures in combination. The antenna 20 of the system 40 is first fixed to a rigid stable surface where permanent mounting is desired. The installer then manually moves the antenna 20 until the received signal strength exceeds a preselected threshold value. When this rough alignment angle Φ is reached, the rough alignment indicator 42 is automatically activated. This indicates to the installer that the antenna 20 is pointed sufficiently towards the broadcast satellite 38 to allow automatic final alignment by electronically steering the antenna beam. The antenna 20 is then permanently fixed in this position and does not need to be physically moved again. The installer next activates the controller sub-system 47 within IRD 45 by selecting a control switch 52, preferably through choosing a menu item through a user interface 50 such as a television. The tuner-demodulator 46 supplies demodulated communication signals to the rest of IRD 45. The tuner-demodulator 46 also supplies an indication of received signal strength to the controller 47. The controller 47, in combination with the tuner and demodulator 46, cooperate to steer the antenna beam within the antenna's steerable angle θ. The final alignment procedure is continued until the received signal strength is maximized. Preferably, this position is achieved when the antenna beam is nearly perpendicular to the antenna surface.

During rough alignment of the antenna 20, the broadcast signals received by the antenna 20 are transmitted via outdoor line 44 to the IRD 45 within the home. The tuner and demodulator 46 downconverts the received signal and calculates a signal strength value. The signal strength value is communicated to the controller 47 which compares the value with a stored threshold signal strength value. The stored value is either downlinked directly from the broadcast satellite 38, or retained in the memory of the controller 47. The threshold signal strength value will differ from receiver to receiver depending on its global location relative to the broadcast satellite 38, and can be a fixed parameter based on a geographic indicator such as a post office zip code.

The controller 47, when in rough alignment mode, sends a signal through line 49 to the tuner and demodulator 46 when the signal strength threshold has been met or surpassed. The tuner and demodulator 46 in turn relays the indicator control signal via outdoor line 43 to the rough alignment indicator 42 mounted on or near the antenna 20. The indicator control signal causes the rough alignment indicator to activate, thereby notifying the installer that the antenna 20 is in the proper rough alignment position.

Preferably, the rough alignment indicator L.E.D. 42 is illuminated when the IRD 45 is in "rough alignment" mode. The L.E.D. then ceases to illuminate when the antenna is properly rough aligned. Alternatively, the rough alignment indicator 42 may comprise an audible signal generator, such as a buzzer or speaker, to notify the installer remote from the IRD 45 of proper positioning. Once the indicator 42 has notified the installer that rough alignment has been completed, the installer may then permanently fix the antenna 20 to the mounting site in the proper position.

Installation may now be completed indoors, remote from the installation position of antenna 20. To finalize the alignment, the installer activates an alignment procedure within IRD 45, preferably by activating a control option on the on-screen user interface 50. Once this procedure is activated, the controller 47 continuously reads the signal strength of the broadcast signals received by antenna 20 via outdoor line 44, tuner and demodulator 46, and link 48. The controller then begins transmitting steering commands via control link 49 to the tuner and demodulator 46. The tuner and demodulator 46 relays the steering commands via outdoor link 43 to the antenna 20. The antenna beam is electronically steered through a predefined series of movements, thereby determining the beam angle at which the signal strength is at a maximum. The antenna beam is then set in this position, and the alignment of the antenna 20 is complete. The beam position is stored within the IRD 45 so that the antenna 20 remains automatically aligned upon power-up of the IRD 45. The aligning sequence can be repeated at any time if the antenna should need to be replaced or repaired.

The preferred embodiment described above allows the user or installer to accurately align a satellite receiver antenna without making an inordinate number of trips between the location of the IRD and the location of the antenna. Final alignment of the antenna may be thus completed by a single user from the convenience of the home. Furthermore, the automatic alignment procedures described above provide extremely accurate antenna positioning, thereby increasing the received signal strength in the receiver system and minimizing the possibility of signal loss due to rain fade or other attenuation conditions.

Of course, it should be understood that a wide range of changes and modifications can be made to the preferred embodiment described above. For example, the control apparatus for final alignment of the antenna may be housed apart from the IRD, thereby allowing for an after-market alignment accessory. Thus, it is intended that the foregoing detailed description be regarded as illustrative rather than limiting and that it be understood that it is the following claims, including all equivalents, which are intended to define the scope of this invention.

What is claimed is:

1. A device for aligning a receiver antenna with a satellite, said device comprising:

a receiver that measures a signal strength value of a signal received from said satellite and issues commands based on said signal strength value;

a receiver antenna in communication with said receiver for receiving said signal from said satellite, said receiver antenna being adapted for electronic alignment with said satellite in response to said commands issued by said receiver, the electronic alignment occurring without physical movement of the receiver antenna; and an indicator located in proximity to the receiver antenna, said indicator signalling when said receiver antenna is sufficiently aligned with said satellite to permit said antenna to electronically align itself with said satellite.

2. The device as recited in claim 1 wherein said receiver antenna further comprises a phased array antenna.

3. The device as recited in claim 1 wherein said receiver antenna further comprises a parabolic dish fixed to a mounting device including a motorized alignment device in communication with said receiver.

4. The device as recited in claim 1 wherein said indicator further comprises a tone emitting device.

5. The device as recited in claim 1 wherein said indicator further comprises a light emitting device.

6. The device as recited in claim 5 wherein said indicator is mounted on said receiver antenna.

7. A device for aligning a receiver antenna with a satellite, said device comprising:

an antenna that receives a signal from a satellite;

a receiver coupled to the antenna and for electronically aligning said antenna with said satellite after the antenna has been roughly aligned with the satellite and without requiring further physical movement of the antenna;

a rough alignment indicator in communication with said receiver and located in proximity to said antenna, said indicator generating a sensible signal of a first duration when said antenna is in rough alignment with the satellite; and a user interface in communication with said receiver.

8. The device as recited in claim 7 wherein said rough alignment indicator is mounted on said receiver antenna.

9. The device as recited in claim 7 wherein said receiver antenna further comprises a phased array antenna.

10. A method of aligning an antenna with a satellite, said method comprising the steps of:

providing an antenna and an indicator located in proximity to said antenna;

securing said antenna on a mounting surface;

physically moving said antenna without removing said antenna from the mounting surface until said indicator signals that said antenna is preliminarily aligned with said satellite;

stabilizing said antenna to prevent further physical movement thereof; and activating a device remote from said antenna to automatically perform final alignment of said antenna with said satellite without further physical movement of the antenna.

11. The method as recited in claim 10 wherein said receiver antenna further comprises a phased array antenna.

12. The method as recited in claim 10 wherein said step of activating a device remote from said antenna to automatically perform final alignment of said antenna with said satellite further comprises selecting an alignment procedure through a user interface.

13. The method as recited in claim 10 wherein said indicator further comprises a light emitting device.

14. The method as recited in claim 10 wherein said indicator further comprises a tone emitting device.

15. The method as recited in claim 10 wherein said indicator is mounted on said receiver antenna.

16. The device of claim 7 wherein the user interface includes a signal strength indicator and at least one control switch to initiate electronic alignment of said antenna.

17. The device of claim 7 wherein said sensible signal is auditory.

18. The device of claim 7 wherein said sensible signal is visual.

19. The method as recited in claim 10 wherein the step of stabilizing is permanent.

20. An apparatus for receiving communication signals from a satellite comprising:

an antenna for receiving electromagnetic signals from a satellite, the antenna being movable to facilitate rough alignment with the satellite;

an antenna controller coupled to the antenna for electronically steering the antenna into final alignment with the satellite without further physical movement of the antenna; and an indicator associated with the antenna, the indicator generating a sensible output when the antenna is in rough alignment with the satellite.

21. An apparatus as defined in claim 20 wherein said antenna comprises a phased array antenna.

* * * * *